(12) United States Patent
Hyde et al.

(10) Patent No.: US 11,809,387 B2
(45) Date of Patent: Nov. 7, 2023

(54) PHARMACEUTICAL/LIFE SCIENCE TECHNOLOGY EVALUATION AND SCORING

(71) Applicant: DR/Decision Resources, LLC, Burlington, MA (US)

(72) Inventors: Brigham B. Hyde, Boston, MA (US); David Greenwald, East Boston, MA (US)

(73) Assignee: DR/Decision Resources, LLC, Burlington, MA (US)

( * ) Notice: Subject to any disclaimer, the term of this patent is extended or adjusted under 35 U.S.C. 154(b) by 15 days.

(21) Appl. No.: 16/598,405

(22) Filed: Oct. 10, 2019

(65) Prior Publication Data
US 2020/0151157 A1 May 14, 2020

Related U.S. Application Data

(63) Continuation of application No. 14/871,616, filed on Sep. 30, 2015, now abandoned, which is a (Continued)

(51) Int. Cl.
*G06F 16/21* (2019.01)
*G06Q 30/0204* (2023.01)
(Continued)

(52) U.S. Cl.
CPC ...... *G06F 16/212* (2019.01); *G06F 16/24578* (2019.01); *G06F 16/3344* (2019.01); (Continued)

(58) Field of Classification Search
None
See application file for complete search history.

(56) References Cited

U.S. PATENT DOCUMENTS 5,991,731 A 11/1999 Colon et al.
6,618,727 B1 9/2003 Wheeler et al.
(Continued)

FOREIGN PATENT DOCUMENTS

EP 0067057 A2 * 12/1982 ........... G06F 16/284
WO 2013082177 A1 6/2013

OTHER PUBLICATIONS

"Definition Parallel processing", whatis.com, 2007, 4 pages.
(Continued)

*Primary Examiner* — Irene Baker
(74) *Attorney, Agent, or Firm* — Weaver IP L.L.C.

(57) ABSTRACT

A method for evaluating and/or scoring pharmaceutical/life science technology is provided. The method includes importing data of a publication; transforming the data into a structured schema; ingesting the structured schema to determine a context of the data and draw associations between the data and a plurality of profiles; and generating a score based on the associations between the raw data and the profiles. The method may also include generating meta-data based on the determined context of the data and/or one or more quantitative metrics having a temporal component based on the ingested data. Related apparatus, systems, techniques and articles are also described.

20 Claims, 8 Drawing Sheets

Related U.S. Application Data continuation of application No. 14/275,163, filed on May 12, 2014, now abandoned, which is a continuation of application No. 13/688,101, filed on Nov. 28, 2012, now Pat. No. 8,725,552.

(60) Provisional application No. 61/564,020, filed on Nov. 28, 2011.

(51) Int. Cl.
   *G06F 16/2457* (2019.01)
   *G06Q 30/02* (2023.01)
   *G06Q 10/10* (2023.01)
   *G06F 16/33* (2019.01)

(52) U.S. Cl.
   CPC ............. *G06Q 10/10* (2013.01); *G06Q 30/02* (2013.01); *G06Q 30/0204* (2013.01)

(56) References Cited

U.S. PATENT DOCUMENTS

| | | |
|---|---|---|
| 6,904,423 B1 | 6/2005 | Nicolaou et al. |
| 7,054,823 B1 | 5/2006 | Briegs et al. |
| 7,386,460 B1 | 6/2008 | Frank et al. |
| 7,634,475 B1 | 12/2009 | Hernek |
| 7,827,125 B1 * | 11/2010 | Rennison ............... G06F 16/906 706/14 |
| 8,725,552 B2 | 5/2014 | Hyde et al. |
| 2002/0013756 A1 * | 1/2002 | Piccioli ................. G06Q 40/03 705/36 R |
| 2003/0028413 A1 | 2/2003 | White et al. |
| 2003/0113797 A1 | 6/2003 | Jia et al. |
| 2003/0177118 A1 | 9/2003 | Moon et al. |
| 2003/0177240 A1 | 9/2003 | Gulko et al. |
| 2003/0225601 A1 | 12/2003 | Hayden et al. |
| 2004/0093331 A1 | 5/2004 | Garner et al. |
| 2004/0205576 A1 | 10/2004 | Chikirivao et al. |
| 2004/0230397 A1 * | 11/2004 | Chadwick .............. G06Q 10/10 702/181 |
| 2005/0246314 A1 * | 11/2005 | Eder ...................... G16H 50/50 |
| 2006/0053151 A1 * | 3/2006 | Gardner ................. G06F 40/35 707/999.102 |
| 2006/0064415 A1 | 3/2006 | Guyon et al. |
| 2006/0129427 A1 * | 6/2006 | Wennberg .............. G06Q 40/08 705/2 |
| 2006/0173663 A1 * | 8/2006 | Langheier .............. G16H 50/50 703/11 |
| 2006/0206374 A1 | 9/2006 | Asthana et al. |
| 2006/0287997 A1 | 12/2006 | Rugh |
| 2007/0011134 A1 * | 1/2007 | Langseth ............... G06F 16/254 |
| 2007/0143300 A1 * | 6/2007 | Gulli ................... G06F 16/2477 |
| 2007/0174086 A1 | 7/2007 | Walker |
| 2007/0282824 A1 | 12/2007 | Ellingsworth |
| 2008/0140616 A1 | 6/2008 | Encina et al. |
| 2008/0243997 A1 * | 10/2008 | Bouzid ................. G06F 9/5027 709/203 |
| 2009/0150323 A1 | 6/2009 | Hively |
| 2009/0216554 A1 * | 8/2009 | Massey ................. G06Q 30/02 707/999.005 |
| 2009/0319518 A1 * | 12/2009 | Koudas ................. G06F 16/338 707/999.005 |
| 2011/0078145 A1 | 3/2011 | Chung et al. |
| 2011/0145301 A1 | 6/2011 | Fabret et al. |
| 2011/0314006 A1 * | 12/2011 | Sweeney ............. G06Q 30/0277 707/723 |
| 2012/0246174 A1 * | 9/2012 | Spears .............. G06F 16/90324 707/749 |
| 2012/0290319 A1 * | 11/2012 | Saria ...................... G16H 15/00 705/3 |
| 2013/0060771 A1 | 3/2013 | Ho et al. |
| 2013/0095864 A1 | 4/2013 | Marovets |
| 2013/0138478 A1 | 5/2013 | Hyde et al. |
| 2014/0330846 A1 | 11/2014 | Hyde et al. |
| 2015/0312200 A1 | 10/2015 | Brav et al. |
| 2016/0004578 A1 | 1/2016 | Selig et al. |
| 2016/0275112 A1 | 9/2016 | Hyde et al. |

OTHER PUBLICATIONS

12854440, "European Application Serial No. 12854440, European Search Report dated Nov. 16, 2016", Decision Resources LLC DR, Nov. 16, 2016, 5 pages.

PCT/US2012/066883, "International Application Serial No. PCT/US2012/066883, International Preliminary Report on Patentability dated Mar. 27, 2013", DR/Decision Resources, LLC, 5 pages.

PCT/US2012/066883, "International Application Serial No. PCT/US2012/066883, International Search Report and Written Opinion dated Mar. 27, 2013", DR/Decision Resources, LLC, 7 pages.

U.S. Appl. No. 15/263,998, filed Jun. 15, 2017, Pending, Travis Donia.

* cited by examiner

PHARMACEUTICAL/LIFE SCIENCE TECHNOLOGY EVALUATION AND SCORING

CROSS-REFERENCE TO RELATED APPLICATION

This application is a continuation of and hereby claims priority under 35 U.S.C. § 120 to U.S. patent application Ser. No. 14/871,616, filed Sep. 30, 2015, which is a continuation of and claims priority under 35 U.S.C. § 120 to U.S. patent application Ser. No. 14/275,163, filed May 12, 2014, now abandoned, and entitled, "PHARMACEUTICAL/LIFE SCIENCE TECHNOLOGY EVALUATION AND SCORING", which in turn is a continuation of U.S. patent application Ser. No. 13/688,101 filed Nov. 28, 2012, now U.S. Pat. No. 8,725,552, and entitled, "PHARMACEUTICAL/ LIFE SCIENCE TECHNOLOGY EVALUATION AND SCORING," which in turn claims priority under 35 U.S.C. § 119 to U.S. Provisional Application No. 61/564,020, filed on Nov. 28, 2011, the contents of each application being expressly incorporated herein by reference in their entirety.

TECHNICAL FIELD

This disclosure relates generally to data analysis and in particular, to assembling, aggregating, and interpreting multiple complex data sources to generate strategic intelligence and business solutions in different topics including, for example, biologic, genetic, biopharmaceutical, and medical topics.

BACKGROUND

Pharmaceutical innovation relies on a continuum of scientific and medical information that aims to address the cause, treat the symptoms, and improve the outcome of diseases. The pharmaceutical industry currently relies on the capacity of the involved stakeholders to evaluate an opportunity, raise the necessary capital, and develop a potential therapy. Assets are commonly purchased and sold at various stages of their life cycle. This has resulted in a diverse marketplace driven by transactions at all stages of drug development—from pre-clinical and discovery through phase III clinical trials.

Transaction decision-making is made based on a number of criteria that aim to maximize the commercial value and future potential of an asset. This is a challenging process, limited by two primary factors: (1) overwhelming depth, breadth, and complexity of scientific information, and (2) a scarcity of accurate and relevant market data.

Thus, there is a need to provide methods and systems for assembling, aggregating, and interpreting multiple complex data sources to generate strategic intelligence and business solutions in different topics.

SUMMARY

In accordance with the present subject matter, a method for evaluating and/or scoring a technology is provided. The method may include: importing data of a publication; transforming the data into a structured schema; ingesting the structured schema to determine a context of the data and draw associations between the data and a plurality of profiles; and generating a score based on the associations between the raw data and the profiles.

In some embodiments, the method may also include generating meta-data based on the determined context of the data and/or generating one or more quantitative metrics having a temporal component based on the ingested data.

In some embodiments of the present subject matter, the method may include assigning a weight to at least one of the profiles, and may also include adjusting the weight.

In some embodiments, the method may also include measuring a confidence in at least one of the associations by calculating a number of times the at least one of the associations has been associated with previous data. This may further include elevating a weighting of the at least one of the associations when the at least one of the associations has been associated with previous data.

In some embodiments, the method includes displaying the score to a user through a user interface.

In some embodiments of the present subject matter, the method includes checking the data against a plurality of predefined key words.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, by assembling, aggregating, and interpreting multiple complex data sources, strategic intelligence and business solutions in different topics can be provided. By generating "Scores" (e.g. ranking) that assess the value and multi-attribute components of various entities such as (for example) drugs (e.g. molecules), companies, genes, people, diseases, and research topics, these quantitative measures may be leveraged, for example, to aid in decision making on investment and/or identify trends for users. The provided systems and methods may be leveraged in a multitude of contexts factorially created by the array of entities being defined. For example, the present subject matter may be used to ask questions of people in a disease, drugs and genes, research topics and companies, etc. This creates value for users in all realms, including for example, life science, from basic to clinical science, as well as within the business context of biopharmaceuticals, life science tools, diagnostics, and patient care.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
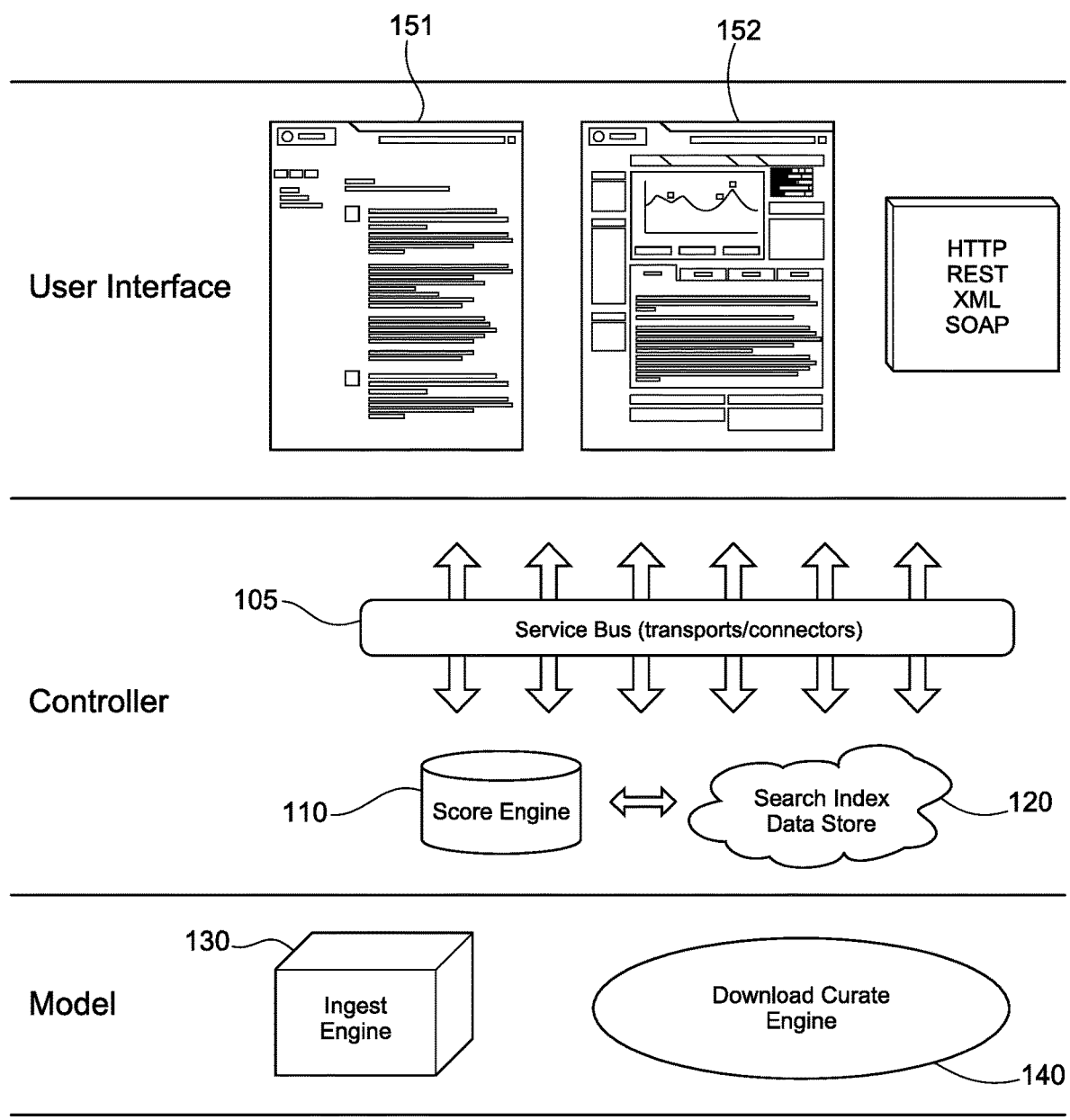
FIG. 1 is an illustration of the overall architecture in accordance with an embodiment of the present subject matter.

FIG. 1 is an illustration of the overall architecture of an embodiment of the present subject matter (which may be referred hereafter as the "Innovation Engine"). The architecture may include three general levels. The foundation of the Innovation Engine is a model, which may include Ingest Engine 130 and Download Curate Engine 140.

Interfacing with the model is a controller (e.g. implemented on a server), which may include Service Bus 105, Scoring Engine 110, and Search Index Data Store 120. Service Bus 105 is in communication with Score Engine 110 and Search Index Data Store 120, and may be configured to handle multiple data connectors (e.g. for ingest) and search work flows.

The controller also interfaces with a user interface (e.g. via a client) to display data to the user on request. As can be seen, the users interface also communicates with Service Bus 105 of the controller. In some embodiments, the user interface can communicate with the controller over the internet or other services, using, for example, HTTP, REST, XML, SOAP, or any combination of protocols and languages. This may be done, for example, by passing objects between the client and the server to handle search queries and chart requests. The user interface may include one or more user views such as views 151 and 152 as shown, and may be configured to provide graphical illustration(s) of data and search functionality.

In some embodiments, the architecture is configured to be data scalable and capable of supporting multiple products. This may be achieved by configuring the architecture to be data agnostic by using connectors to enable structured and unstructured data to build on existing system. The architecture may also be configured to provide workflow flexibility to enable database interaction. For example, in some embodiments, the scoring workflow can be carried out in parallel or through query functions. This way, a new product can be provided by providing a new user interface and a new query workflow, and the architecture is thus scalable to multiple products.

The present subject matter may be utilized in many different fields and topics. For example, decisions regarding drug development are complex and rely on multiple variables and factors. Successful commercial biopharmaceutical development may require patent protection in order to justify the capital risk associated with development. The patent application database therefore serves as a base layer for drugs in development. However, underlying any patent application is the basic medical science, which is the main driver of innovation. The decision to target a particular mechanism of action for a disease may be based on the scientific literature and publically available data. Many of the underlying scientific trends precede novel patentable material, if not overtly then through inference. Transactions are ultimately influenced by the current perception of the scientific evidence, the interpretation of scientific trends by scientists and business partners, deal factors such as the interaction with the commercial entity, and market potential.

Figure 2A:
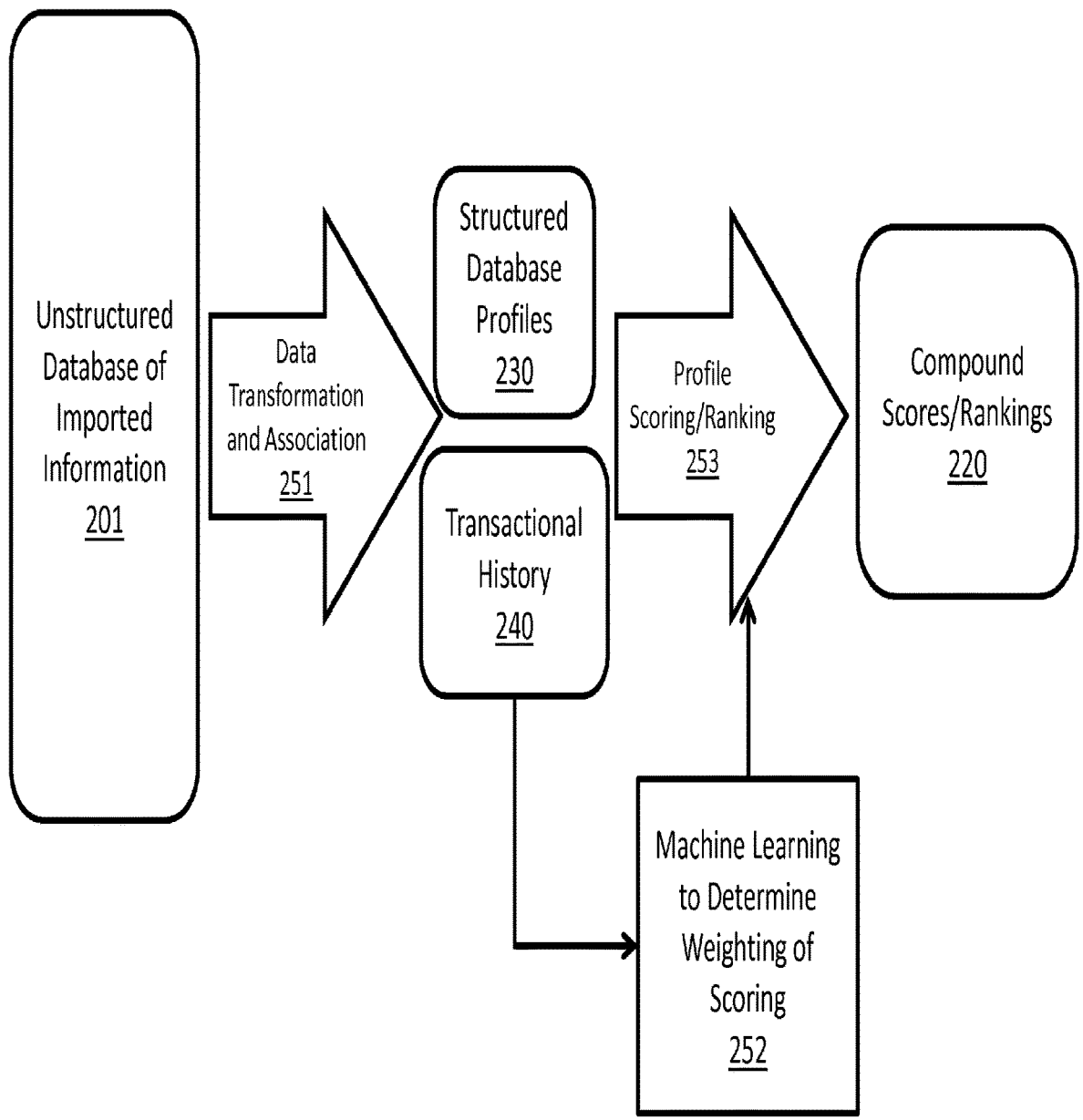
FIGS. 2A and 2B are process flow diagrams illustrating the data and process steps of an embodiment of the present subject matter.
Figure 2B:
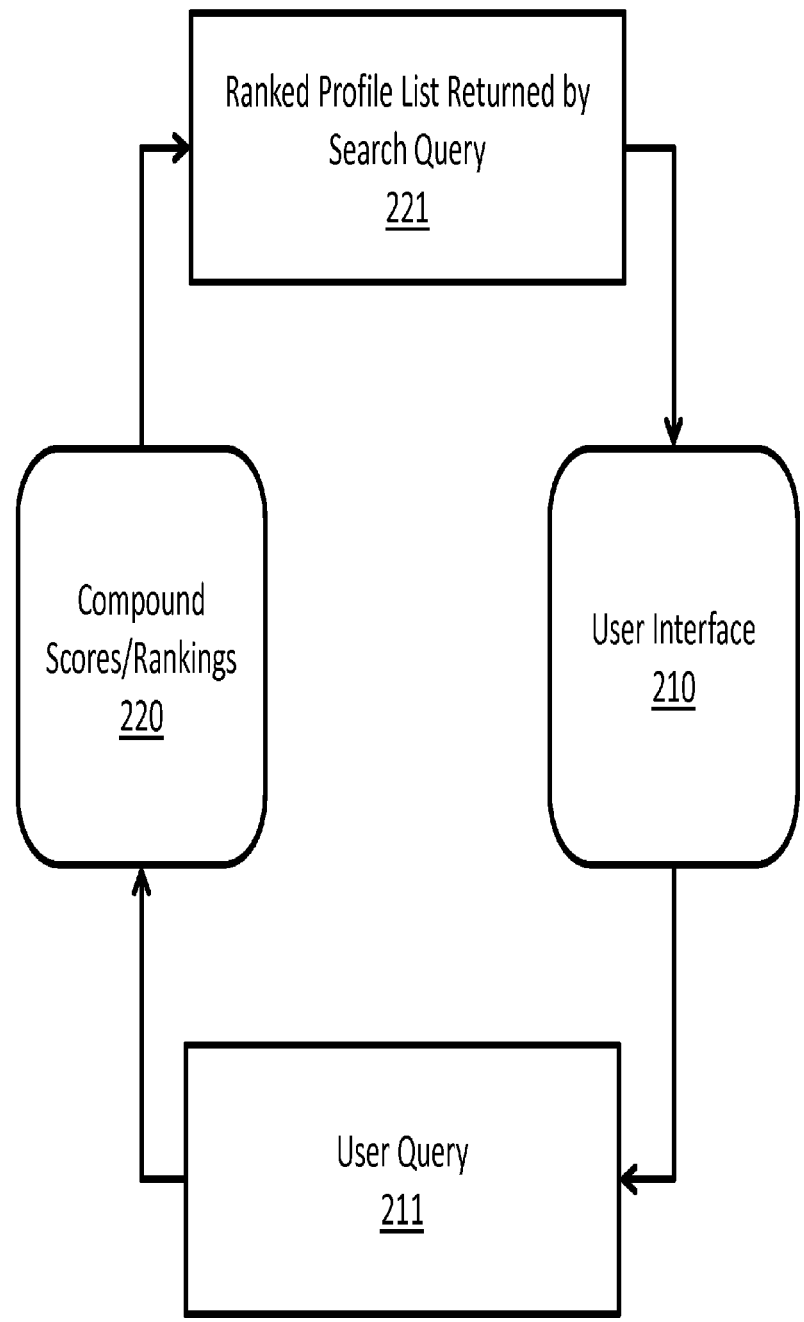

FIGS. 2A and 2B are process flow diagrams illustrating the data flow and process steps in accordance with one embodiment of the present subject matter. As shown in FIG. 2A, the Download Curate Engine 140 imports (e.g. downloads) at 201 raw data from one or more sources. These sources may include one or more sources of relevant data to be analyzed, including for example, National Library of Medicine PubMed, United States Patent and Trademark Office (USPTO), National Institutes of Health (NIH), Clinical Trails, Swiss Gene Prot database, Online Mendelian Inheritance in Man (OMIM), Kyoto Encyclopedia of Genes and Genomes (KEGG) Database, the US Food and Drug Administration database of Approved Drug Products with Therapeutic Equivalence (a.k.a. Orange Book), historical transaction information, molecule target association list, disease list and sub categorization, and conference abstract lists. In some embodiments, the raw data is imported daily.

At 251, the raw data are transformed by Ingest Engine 130 for ingest to a schema by taking the raw data and converting it from its original format into a structure that can be interpreted by a downstream logic. A schema is a generalized architecture of document contents, which enables the system to break a larger piece of text into subsections. In some embodiments, the schema is utilized by targeted extraction of ontologies and selective targeting of queries. For example, breaking the text of a press release into subsections in order to ask specific questions of the first paragraph as opposed to the second. The value of this approach in concert with ontologic and natural language driven queries is that it applies domain specific knowledge of the construction of the language within these documents to enable accurate extraction of information that is very difficult (if not impossible) to accomplish simply by keyword searching.

One component of the Innovation system is the use of natural language and controlled vocabulary phrases used to identify key concepts in scientific, medical, clinical and business literature. In some embodiments, these phrases are grouped by key concepts to identify stage of development of pharmaceutical assets. This detection of experimental concepts and stages of development uses expert knowledge of drug development and life science research combined with text extraction and mapping. This approach is unique because the detection of key natural language concepts is designed to detect concepts specifically important to the value of a drug asset. This differs principally from typical natural language approaches which look for common terms and require no expert know-how in fields of life science and or biopharma.

Using text-mining and natural language processing, Ingest Engine 130 mines and processes the text to add meta-data to incoming data streams (i.e. schemas) that apply a context and/or describe "what it's about." Ingest Engine 130 also ingest the instance of the schema transform (or parse) each document (with Entity Extraction) into fields. In some embodiments, this is done using XML workflows/connectors.

Ingest Engine 130 also performs an association process, which is important to determining and automating the association of (e.g.) drugs, diseases, genes, companies, people, and research topics. This process today is largely manual or wrought with false positives and negatives when done through keyword association. In some embodiments, Ingest Engine 130 applies weighting to specific sources of association (e.g. mentions in a press release outweigh mentions in a PubMed document), normalizes to commonly mentioned entities (e.g. cancer is often mentioned with many things, but may only be truly associated with a subset), and adds a contextual basis (e.g. a given person may only be associated with a drug in a basic animal testing sense as opposed to a financing and fundraising sense). This context is important to defining appropriate associations. In some embodiments, this process is utilized to automate the process of profile building for, e.g., a given drug or company in the Innovation Engine. In some embodiments, data transformation and association 251 is run daily. In some embodiments, this is run when new data is imported.

In some embodiments, one or more of the following features may be extracted for each type of publication.

For PubMed: Metadata from the publication record; Journal name; Title; Abstract; Listed Keywords; All author's names; Authors order; Specifically first 2 author and last three authors; Institution referenced; Department; Institution/commercial entity; City; Pubmed ID; Publication Date; Day; Month; Year; EPUB Date; DOI; NME; Calculated fields; Gene/protein name in title; Gene/protein name in abstract; Disease in title; Disease in abstract; Molecule name in abstract; Molecule name in Title; Tissue referenced in abstract; Tissue Referenced Title; Presence or absence of specific "key words" in abstract; Presence or absence of "Relay Key Words" in title; Alchemy Identified terms; and State.

For conference abstracts: Conference name; Gene/protein name in title; Gene/protein name in abstract; Disease in title; Disease in abstract; Molecule name in abstract; Molecule name in Title; Tissue referenced in abstract; Tissue Referenced Title; Presence or absence of "Relay key words" in abstract; Presence or absence of "Relay Key Words" in title; Listed Keywords; Alchemy Identified terms; All author's names; Authors order; Specifically first 2 author and last three authors; Institution referenced; Department; Institution/commercial entity; City; State, For Intellectual Property: Patent Number; Date of issuance; Inventors names; Inventor affiliation; Inventor location; Assignee; Assignee location; Filing date; PCT filing date; Application number; PCT number; PCT PUB date; PCT PUB no.; Foreign application countries; Foreign application dates; Patents cited; Numbers; Dates; Inventors; Foreign patents cited; Number; Country; Dates; Examiner; Attorney, agent or firm; Number of claims; Gene/protein name in title; Gene/protein name in abstract; Disease in title; Disease in abstract; Molecule name in abstract; Molecule name in Title; Tissue referenced in abstract; Tissue Referenced Title; Presence or absence of specific "keywords" in abstract; Presence or absence of specific keywords in title; Listed Keywords; Alchemy Identified terms in title; Alchemy Identified terms in the Abstract; Chemical Nomenclature Term in Title; Chemical nomenclature term in Abstract; Gene/protein name in Claims; Number of times; Number of claims present; Gene/protein name in description; Disease in claims; Number of times; Number of claims present; Disease in Description; Molecule name in claims; Number of times; Number of claims present; Molecule name in Description; Tissue referenced in Claims; Number of times; Number of claims present; Tissue Referenced Description; Presence or absence of "Relay key words" in claims; Number of times; Number of claims present; Presence or absence of specific keywords in Description; Alchemy Identified terms in Claims; Alchemy Identified terms in the Description; Chemical Nomenclature Term in Claims; Chemical nomenclature term in Description;

For Chemistry and Physical Properties: Molecular weight; Log D; Log P; Number of stereogenic centers; Number of heteroatoms; Number of hydrogen bond donors; Number of hydrogen bond acceptors; Aqueous solubility (mg/mL at different pH's); Number of steps in synthesis; Crystallinity; Polymorphism; Melting point; Stability—solid state, thermal, hydrolytic, photo, stereoisomeric; Salt forms.

For Existing Drug Candidates: Imported list; Target/mechanism; Chemical name; Marketing name; Development name; Associated Commercial entity.

For Orange Book: Active Ingredient; Dosage Form Route; Concentration; Proprietary name; Commercial applicant; Therapeutic equivalence; Application number; Approval date; Patent expiration; Drug substance claim; Drug product claim.

For Clinical Trial Information: Gene/protein name in title; Gene/protein name in purpose; Disease in title; Disease in purpose; Molecule name in purpose; Molecule name in Title; Tissue referenced in Purpose; Tissue Referenced Title; Presence or absence of "Relay keywords" in Purpose; Presence or absence of "Relay Keywords" in title; Listed MESH terms; Alchemy Identified terms in title; Alchemy Identified terms in the Purpose; Chemical Nomenclature Term in Title; Chemical nomenclature term in Purpose; CTG identifier; Sponsor; First received; Last updated; Condition; Intervention; Phase; Study Type; Study design; Primary outcomes; Secondary outcomes; Estimated enrollment; Start Date; Estimated completion date; Number of arms; Inclusion criteria; Exclusion criteria; Locations; Investigators; Study sponsor; Publications; Author; Journal; Date; Title; Pubmed ID.

For NIH Grant Database: Primary investigator; PI email; Title; Awardee organization; Project number; City; State; Study Section; Project start date; Project end date; Administering institution; Total funding; Year; Funding per year; Project terms; Pub med ID of associated publications; Associated clinical trial identifier; Associated patent number; Gene/protein name in title; Gene/protein name in abstract; Gene/protein name in Keyword list; Disease in title; Disease in abstract; Disease in Keyword list; Molecule name in abstract; Molecule name in Title; Molecule name in Keyword list; Tissue referenced in abstract; Tissue Referenced Title; Tissue referenced in keyword list; Presence or absence of specific key words in abstract; Presence or absence of specific Key Words in title; Presence or absence of specific keywords in keyword list; Alchemy Identified terms in title; Alchemy identified terms in abstract.

In some embodiments of the present subject matter, structured database profiles 230 are generated and maintained within the Innovation Engine. For example, attributes associated with biopharmaceutical assets may be assigned to different categories. In some embodiments, the categories (or profiles) may include one or more of:

1. Molecule.
2. Compound.
3. Gene (e.g. the associated gene/mechanism).
4. Disease (e.g. disease area or therapeutic market opportunity).
5. Personnel (e.g. the people involved).
6. University/Commercial Entity (e.g. the associated commercial entities).
7. Intellectual Property (e.g. patents/patent applications).

Decisions regarding asset development may take into account one or more of these factors. In some embodiments, as new information enters the system, it is automatically incorporated within their profiles.

Figure 3:
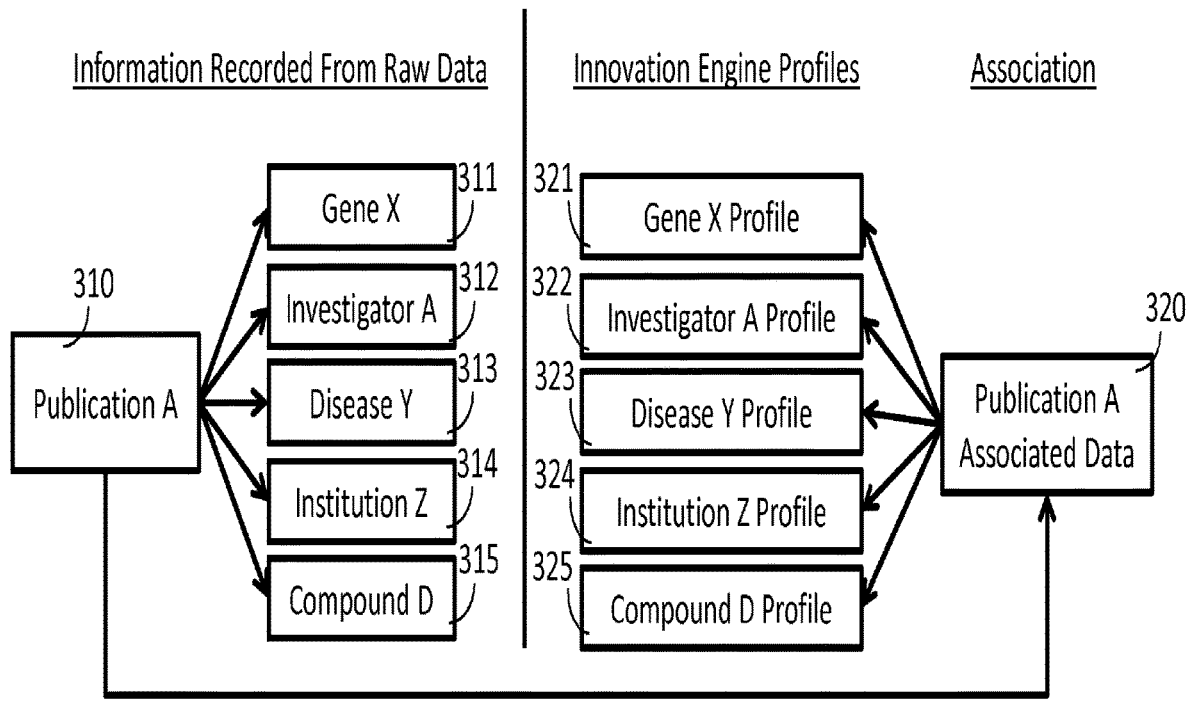
FIG. 3 is a graphical illustration showing data transformation and association of an embodiment.

As an example, FIG. 3 is a graphical illustration showing the Data Transformation and Association 251. As shown, Publication A is imported from a source (e.g. as raw data). Publication A includes various information, including Gene X 311, Investigator A 312, Disease Y 313, Institution Z 314, and Compound D 315. By performing the data transformation and association process discussed above, Ingest Engine 130 generates Publication A Associated Data 320, which includes Gene X Profile 321, Investigator A Profile 322, Disease Y Profile 323, Institution Z Profile 324, and Compound D Profile 325. In some embodiments, Ingest Engine 130 may be configured to query this data to assess the quality of association. Examples of such queries include "Has this gene been previously associated with this disease?" 351; "Has this investigator been previously associated with this disease?" 352; "Has this institution been previously associated with this disease?" 353; and "Has this compound been previously associated with this disease?" 354.

In some embodiments, the Innovation Engine maintains a dynamic database of experiments and milestones, e.g. as a drug (e.g. molecule) continues its iterative process of development to track its progress. By anticipating the logical progression of drug development, the Innovation Engine provides a framework for which to benchmark commercial drug development. In addition, by following scientific trends through grants issued, publications, patents, and people, the nuance of "discovery" can be projected and trends can be identified at early stages. To this end, at 253, Scoring Engine 110 may be configured to specifically identify and predict scientific trends by assigning a "Score" to, for example, each molecule, key opinion leader, commercial entity, and/or disease pathway. In some embodiments, the Score may be a numerical value representing the likelihood that the market will favor assets associated with an entity.

Figure 4:
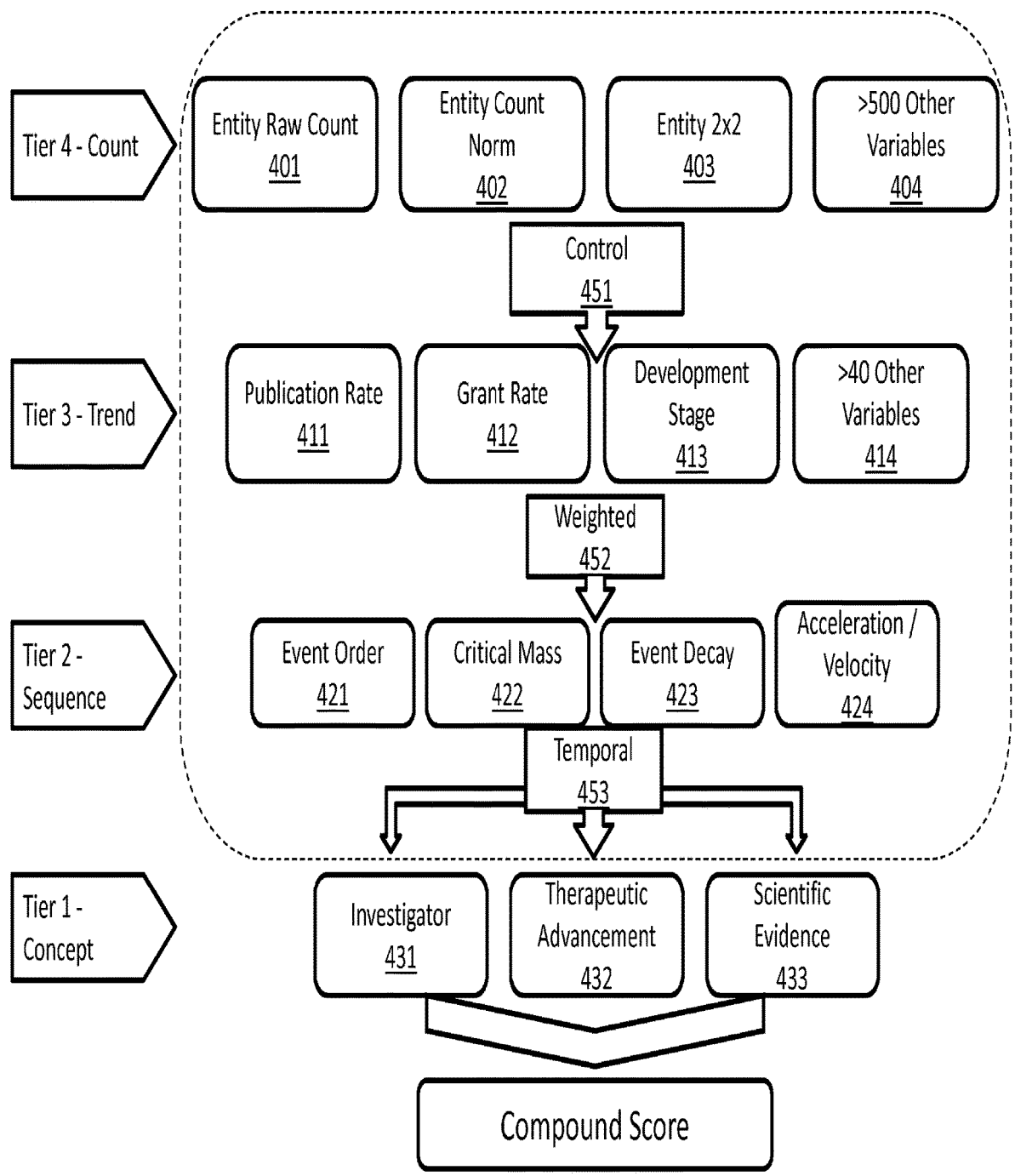
FIG. 4 is a process flow diagram of a scoring process in accordance with an embodiment of the present subject matter.

FIG. 4 is a process flow diagram of scoring in accordance with an embodiment of the present subject matter. In this embodiment, the scoring includes four general steps (Tiers 1-4).

Tier 4 includes variable calculation and counting. This may include counting the context specific occurrence of a variable (e.g. Entity Raw Count 401, Entity Count Norm 402, Entity 2×2 403, and the number of other variables: >500 Other Variables 404). For example, a drug has been mentioned 3 times with positive news about clinical trial results in breast cancer. This generates a count which can be manipulated by, e.g., normalization, or binary filter to produce additional variables. These variables can be normalized to an aspect of the entities mentioned, e.g. to the company, drug, disease, or by phase.

Tier 3 includes generating trend data such as, e.g., Publication Rate 411, Grant Rate 412, Development Stage 413, and >40 Other Variables 414. For example, the 3 mentions of positive data in clinical trials (referenced above) represent 5% of all positive mentions of clinical trial data in breast cancer, or the growth in mentions over the last 3 years is the third highest of all breast cancer drugs.

Tier 2 includes sequence variables that have a temporal component. For example, by assembling the variables of Tiers 4 and 3 for a given drug and analyze them on a temporal basis, both in terms of how they compare to other breast cancer drugs, but also how the different variables relate to each other temporally. This may include weighting through machine learning against other drugs with positive outcomes, and creating additional variables related to sequence of events.

Tier 1 includes variables such as, e.g. Investigator 431, Therapeutic Advancement 432, and Scientific Evidence 433. These variables roll up to become primary variables for evaluation of Scoring (e.g. Compound Score) of a given therapeutic. In some embodiments, this score is calculated daily, and/or recalculates as time advances and as new information enters the system.

In some embodiments, one or more of the following variables may be used: The following are the specific variables considered by Scoring Engine 110:
Categories:
  Stage of Development;
  Scientific Relevance;
  Therapeutic Relevance;
  Intellectual Property Protection;
  Inventor Profile; and
  Commercial Entity/Institutional Profile.
Sub-Categories:
  Clinical Stage;
  Experimental Stage;
  Transactional Stage;
  Gene/Mechanism Score;
  Alignment with Current Indication Standards;
  Therapeutic Criteria;
  Intellectual Property Score;
  Inventor/Investigator Score;
  University Score;
  Commercial Entity Score; and
  Commercial History.
Variables Measured:
  Development Stage:
  In vitro efficacy;
  In vitro toxicity;
  in vitro binding assay;
  in vitro dose escalation study;
  Mouse efficacy;
  Mouse toxicity;
  Mouse dosing;
  Rat efficacy;
  Rat toxicity;
  Rat dosing;
  Disease specific In vivo model;
  Oral dosing in vivo;
  Licensed at least once;
  Acquired as part of an M&A transaction;
  Genetic Knock Out (KO) Animal published;
  Genetic population study published;
  in vitro genetic study published;
  Cell line KO published;
  Number Clinical Trial; Gene;
  Number of Clinical trials; molecule;
  Funding history from NIH, NSF, DoD;
  Funding from Disease Foundations;
  Capital investment from Angel investors;
  Capital investment from Venture Capital investors; and
  Matching of known attributes to therapeutic criteria (oral, vs IV etc).
Preclinical Pharmacokinetics (PK):
  Absorption—CACO-2 permeability;
  Cmax;
  Route of absorption;
  Distribution (Vss);
  Route of elimination/clearance;
  Route of metabolism;
  Hepatocyte or microsome stability/metabolism;
  Cyp inhibition—5 isoforms;
  Cyp induction—5 isoforms;

Known metabolites, metabolite ID;
Clearance;
Bioavailability;
CNS penetration;
Dose-related exposure, proportionality, linearity;
Half-life (% F); and
Plasma protein binding.
Preclinical Safety/Toxicology:
In-vitro
  hERG IC50;
  AMES genetic tox;
  CHO chromosomal aberration;
  Selectivity panel, ligand profile; and
  Cellular LD50, LD90.
In-vivo
  Micronucleus;
  Cardiovascular function, QT Prolongation;
  Respiratory function;
  CNS function—Irwin Test;
  Renal function;
  Hepatic function;
  GI transit;
  Maximum tolerated dose (MTD);
  NOAEL;
  Therapeutic Index: EC50/LD50; and
  Dose/exposure relationship.
Preclinical Pharmacology, PD and Efficacy:
In-vitro
  Enzymatic IC50, IC90; and
  Cellular EC50, EC90.
In-vivo
Animal disease models, ED50; and
Dose-response relationship.
IND-Enabling Studies:
  Single does and dose-ranging study (rat and/or dog);
  Acute toxicology (rat and/or dog);
  14 or 28-day toxicology (rat and/or dog);
  Acute toxicology (monkey);
  14 or 28-day toxicology (monkey);
  Rat/Rabbit teratology; and
  CV function in Telemetered dogs or monkeys.
Patent Characteristics:
  Term of Protection 20-18 years;
  Term of Protection 17-15 years;
  Term of Protection 12-15 years;
  Term of protection 10-12 years;
  Term of protection 8-10 years;
  Term of protection 4-8 years;
  Term of protection 0-3 years;
  0-5 divisionals and continuations;
  <5 divisionals and continuations;
  Disease prevalence in geographic region of coverage;
  Relative strength of Intellectual Property Protection law in region of patent;
  Total number of issued claims;
  claims less than 15 words;
  claims considered novel and broad based on Relay Keywords approach;
  patents cited as prior art;
  1st 5 claims are over 20 words;
  Ratio of issued to filed claims from application;
  outside counsel law firm ranking;
  composition of matter protection;
  method patent;
  market size of covered indications;
  Prior art score, # of patents;
  Assignee score company vs. university vs. individual; and
  International freedom to operate score.
Investigator and institution:
  Number of patents and growth rate;
  Number of patents issued vs. filed;
  Total number of patents;
  Number of research grants;
  Number of training grants;
  Number of fellowship grants;
  Number of other awards;
  Number of R&D contracts;
  Number of invention disclosures;
  Options and licenses, growth;
  Number of start up companies, growth, success;
  Licensing income;
  Sponsored research income; and
  Intellectual capital; # of PhD's, MD's, faculty, Size of endowment.
Scientific Factors:
  Overall publication rank of gene;
  Frequency and prominence of scientific review articles as measured by impact factor and citation index;
  Genetic evidence;
  In vivo evidence;
  Xenograph animal models;
  Survival curves;
  Chromatin Immunoprecipitation;
  Protein binding characterization;
  Genome Wide Association Studies (GWAS);
  MicroArray data;
  Western blot verification in vitro;
  Western blot verification in vivo;
  Cell binding assay;
  In vivo efficacy;
  In vivo rescue experiments;
  Single nucleotide polymorphism (SNP) identification;
  High throughput screening; and
  Lead candidate identification.

In some embodiments, the Compound Score (CS) is generated as:

$$CS=(\alpha+\beta+\chi))+((\delta+\varepsilon+\phi+\gamma+\eta)+(\iota)+(\varphi+\kappa+\lambda+\mu+\nu+o+\pi+\theta+\rho)+(\sigma+\tau+\upsilon+\overline{\omega}+\xi+\psi+\zeta)$$

Wherein:

| | | |
|---|---|---|
| Stage of Development: | $\alpha$ | Phase Score: 10 points for Phase 2 and above; 5 points for phase 1; 1 point for IND; 0 points for Preclinical |
| | $\beta$ | Experimental Stage: in vitro efficacy, if Y + 3; in vitro toxicity, if Y + 3; in vitro binding assay, if Y + 3; in vitro dose escalation study, if Y + 3; Mouse efficacy, if Y + 5; Mouse toxicity, if Y + 5; Mouse dosing +5; Rat efficacy, if Y + 5; Rat dosing + 5; Disease specific In Vivo model; Oral dosing in vivo, if Y + 5 |
| | $\chi$ | Transactional stage: Licensened at Least once, if Y + 3; acquired as part of an M&A transaction, if Y + 3; |
| Scientific Relevance: | $\delta$ | Publication Trent: (genetic KO published, if Y + 5; Genetic population study published, if Y + 5; in vitro genetic study published, if Y + 5 . . .) |
| | $\varepsilon$ | Clinical Trial Trend |
| | $\phi$ | NIH Grant Trend |
| | $\gamma$ | Conference Abstract Trend |
| | $\eta$ | Commercial Trend |
| Therapeutic Relevance: | $\iota$ | Matching of known attributes to therapeutic criteria (oral vs IV, etc.) |
| IP Score: | $\varphi$ $\kappa$ $\lambda$ $\mu$ | Points for 5-8 years, (5 points for 3-5 years, −5 points for 0-3 years) + (10 points for 0-5 divisionals and continuations or 20 points for <5 divisionals and continuations). Note: Weighting variable dependent |

| | | |
|---|---|---|
| | ν | upon indication(s), average length of clinical trials |
| | ο | for specific indication, previous licensing trends based covers >40% market) + Relative strength of Intellectual |
| | π | |
| | θ | Property Protection law (5 points if top $10^{th}$ percentile of CDI, 4 points if $10\text{-}25^{th}$ percentile, 3 points if $25\text{-}50^{th}$ percentile, −5 points if $50\text{-}100^{th}$ percentile) Less than 15 words) + (2 points if $1^{st}$ claim considered novel and broad based on bag of words approach) + (1 point if more than 25 patents cited as prior art and $1^{st}$ 5 claims are over 20 words) + (1 point if ratio of issued to filed claims >7). Outside Counsel from top $50^{th}$ percentile law firm) + (8 points if internal counsel) + (2 points if top $25^{th}$ percentile attorney, 1 point if top $50^{th}$ percentile attorney) Type of patent: 12 points if composition of matter protection, 8 points if method patent as determined by bag of words approach Sum of market size of covered indications >$600M, then 8 points; if sum of market size of covered indications >$400M, then 6 points; if sum of market size of covered indications >$200M, then 4 points Prior Art Score: 5 points if <5 patents; 4 points if <10 patents; 3 points if <20 patents; 2 points if <40 patents; 2 points if <60 patents; 1 point if >60 patents. Assignee Score: 5 points if from top $25^{th}$ percentile commercial entity; 3 points if from top $50^{th}$ percentile commercial entity; 3 points if from top $10^{th}$ percentile academic entity. |
| | ρ | International Freedom to Operate Score: 20 points if positive |
| Commercial Entity/ Institution Score: | σ | NIH Awards: Total number, number of research grants, number of training grants, number of fellowship grants, number of other awards, number of R&D Contracts. |
| | τ | Number of invention disclosures |
| | υ | US Patents: new applications, growth year over year, total filed, total issued |
| | ϖ | Foreign patents: new applications, growth year over year, total filed, total issued |
| | ω | Options/licenses concluded |
| | ξ | Number of start-up companies |
| | ψ | Income: licensing income, sponsored research income |
| | ζ | Intellectual capital: # Ph.Ds, # MDs, size of endowment, total # faculty |

In some embodiments, the Score is generated to correspond to a relative value to a drug asset based on its likelihood of a transactional event in the following twelve months. This may be important for three main reasons: (1) it provides a measurable outcome; (2) it solves the issue of "market value;" and (3) it gives a relative value metric to assets.

As shown in FIG. 2A at 252, machine learning may be applied to determine weighting of score, e.g., when the attributes and subvariables of a given drug have been calculated and these attributes are then compared quantitatively to the attributes of drugs that historically have achieved success through value creation events. For example, when analyzing phase 2 diabetes drugs, all the drugs that have either been licensed, achieved clinical success, advanced phase, or received additional funding can be analyzed. Regression may be applied to the variables and attributes of these historical drugs to determine which ones have the highest influence on outcome. Based on these calculations, the Innovation Engine assigns the variables and attributes with the highest influence with more weight in calculating new Scores.

While the use of the Innovation Engine in biopharma drug development/business development has been provided as an example, uses in other areas, such as medical devices, chemical, physical, and energy technology development are also possible. For example, additional data sources may be imported to develop separate products (e.g. with different weightings, sub-Scores and Compound Scores, etc.) for different vertical markets, and the approach of the present subject matter may be applicable in those settings as well.

As discussed above, the Innovation Engine may include a data transformation step 251 involving drawing associations between data sources within the profiles (e.g. Molecule, Compound, Gene/Mechanism, Disease, Personnel, University/Commercial Entity, and Intellectual Property as discussed above). For example, once a publication or patent becomes associated with a profile, all associated data becomes a part of that profile. In some embodiments, one or more associative rules are run upon database updates daily.

In one example, publication title and abstract are searched for the presence of the gene/disease/molecule/investigator/institution or its synonym(s). If an association is found, the Pubmed ID, data, and record are added to the gene/mechanism profile.

The Innovation Engine may also include measuring the confidence in an association through triangulation of existing profiles, once the association is drawn. For example, if an investigator recorded from a publications author list has been previously associated with the disease, gene, and/or molecule found in that same publication, the publication receives a higher "confidence" or "quality" score. In some embodiments, associations of higher confidence receive elevated weighting when considering profile ranking.

To determine the relevant development information associated with a given molecule or disease mechanism in an automated fashion, in some embodiments, the Innovation Engine utilizes a list of keywords which draw further inference about the meaning of an imported piece of data. For example, if a publication contains gene X, molecule Y, and the word "inhibit", "inhibition" and/or "inhibitor," that publication is recorded as a publication that my describe inhibition of gene X by molecule Y. Similarly, it may be recorded that molecule Y may be an inhibitor of gene X. Confidence in these types of associations may be built in the same way that other associations are built. This information may be considered when ranking molecules.

In order to answer the question "what molecule is most likely to be acquired next?" the attributes of a molecule may be considered when valuing and acquiring an asset. The components may include one or more categories including, for example:

1. Stage of development: this may include, for example, clinical stage, experimental stage, and transactional stage. In some embodiments, a sub-score is generated accordingly (e.g. between 0 to 25).
2. Relevance of asset to therapeutic opportunity: this may include, for example, matching of current treatment standards, and/or therapeutic criteria. In some embodiments, a sub-score, for example, in the range of 0 to 12.5 is generated.
3. Scientific relevance/importance: this may include, for example, the gene/mechanism. In some embodiments, a sub-score may be generated based on a search criteria, which may be, for example, in the range of 25 to −25.
4. Intellectual property protection: this may include, for example, patents and/or patent applications. In some embodiments, a sub-score, for example, in the range of 12.5 to −100 may be generated.
5. Profile of inventor: this may include, for example, a sub-score of the investigator based on search criteria. In some embodiments, the sub-score has a range of, for example, 12.5 to 0.
6. Profile of commercial entity/institution: this may include, for example, a sub-score of the commercial entity/institution based on search criteria and/or commercial history. In some embodiments, the sub-score has a range of, for example, 12.5 to 0.

At 253, one or more sub-scores discussed above may be generated, and based on relevance, may be added to generate one or more Compound Scores (or simply Scores) 220.

As an example, the Innovation Engine may provide one or more Scores that include one or more components including, for example:

1. Disease Subcategory: Diseases can fall into therapeutic categories (e.g. cancer), and more specifically indications (e.g. prostate cancer). The Score for a particular drug molecule or key opinion leader may be calculated differently for both therapeutic categories as well as specific indications. For example, Professor Y at University X might have a Score of 95/100 for lung cancer, but only a Score of 45/100 for breast cancer. This determination may be based on the specific research that he/she conducts, and how it relates to the market trends for each indication. For example, scientific publications have suggested that RNAi would be best suited for an easily accessible and immune-privileged organ such as the eye. Accordingly, the Innovation Engine may be configured to assign an investigator working on developing RNAi technologies for the liver with a lower relative Score than an investigator working on RNAi for eye disease.
2. Risk of Stage of Development: Risk of commercial development is inherently tied to the stage of development of the drug molecule. The earlier the stage of development, the greater the risk. This is particularly the case in pre-clinical drug development, where there are many 'shades of grey' when describing the stage of development of a molecule (in vitro, in vivo, toxicology, etc.). Just as the risk of technology may be impacted by the most advanced phase of development, the Innovation Engine may also be configured to take into account the current stage of the individual molecule when calculating the Score.
3. Scientific Factors: There are scientific factors such as toxicology, pharmacodynamics, and pharmacokinetic data that may impact the probability of successful drug development and licensing. Much of this data may be included in patent abstracts, publication abstracts, and other data sources that may be imported into the Innovation Engine. The Engine may include one or more additional proxies, such as, for example, the prestige of the publication, which can be measured by factors such as journal impact factors, and quantity/quality of citations.
4. Importance of Intellectual Property: Intellectual property, as mentioned previously, can play a quintessential factor in deciding which drugs to license/acquire for commercialization. There are many factors that can influence the strength of biomedical intellectual property, such as the term protection remaining, the breadth of claims granted and indications listed, among other factors.
5. Importance of University/Commercial Entity: Drug development decisions are not only made by examining scientific data. There are socially driven factors that influence the decision-making process that are subtler, and are inherently more subjective than objective. The reputation of particular Universities for having a successful track record of innovative science and efficient technology transfer are factors that influence this variable. In some embodiments, the Innovation Engine incorporates quantitative metrics to calculate the impact of such factors.
6. Importance of People and Relationships: Associated with the importance of the reputation of the University/Commercial Entity are the personal relationships between, for example, scientists, investors, and/or business people. In some embodiments, the Innovation Engine examines one or more of the co-authorship of scientific publication, co-inventors on patents, venture capital and angel financings, and other relationships to quantify the social network (e.g. of scientists) in a quantitative manner. In some embodiments, this aspect directly impacts the scores for commercial entities, Universities, and/or researchers/key opinion leaders.

In some embodiments, the Innovation Engine provides a score having a range that is determined by one or more of, for example, the therapeutic category, indication, mechanism(s), and phase of development. In some embodiments, the Score is normalized to 100, and can vary depending on the above variables, and evolves with market trends.

In some embodiments, the Innovation Engine builds the Score over time. For example, the Score for a particular drug molecule may increase/decrease as, for example, additional validation from experiments become available, and/or as the marketplace evolves and additional licensing transactions are made. This continuous feedback may adjust the Score positively and/or negatively. For example, if a drug molecule reports an adverse side effect in phase I clinical trials, the Score will be negatively impacted. Conversely, if licensing trends reveal a trend towards stem cell therapies for a particular indication, drug molecules utilizing such a technology would be favorably impacted.

In some embodiments, a "perfect" score essentially represents the highest likelihood that the biopharma industry will act in a particular direction. A "perfect" score for a particular indication and phase of development is achieved when all relevant scientific experiments have been conducted and published in peer-reviewed scientific journals. Market forces such as terms of intellectual property protection, capital investment and licensing trends support the technology in a statistically significant manner.

In some embodiments, the distribution of weighting factors that influence the Score may be determined by rigorous historical analysis of drug development trends, clinical trial results, and licensing/merger & acquisitions data. As new data continuously becomes available through the data sources the popular the Innovation Engine database, the weighting of specific factors may be adjusted at 252 to accurately reflect the current trends in drug development.

In some embodiments, the Innovation Engine includes an internal quality assurance alert system which automatically notifies a user when significant changes occur to Scores for, for example, molecules, key opinion leaders, genes/mechanisms, diseases, Universities, and Commercial Entities. This system allows the user to monitor developments as they occur, and also enable proactive quality assurance checks to be made. In some embodiments, the system includes identifying of statistical outliers, and makes this information available for quality control measures to be taken.

There are many factors that simultaneously impact the probability of a transaction occurring. The specific factors may vary based on, for example, indication and phase of development, and may be determined through the machine learning approach.

Referring now to FIG. 2B, the Innovation Engine may provide a user interface 210 through which the user may access the Scores 220 and other data (e.g. the original data sources and other data provided by the Innovation Engine). This may be done by generating and sending a user query 211 to the controller, processing the user query 211, and generating and sending a ranked profile list returned by the search query 221.

Figure 5:
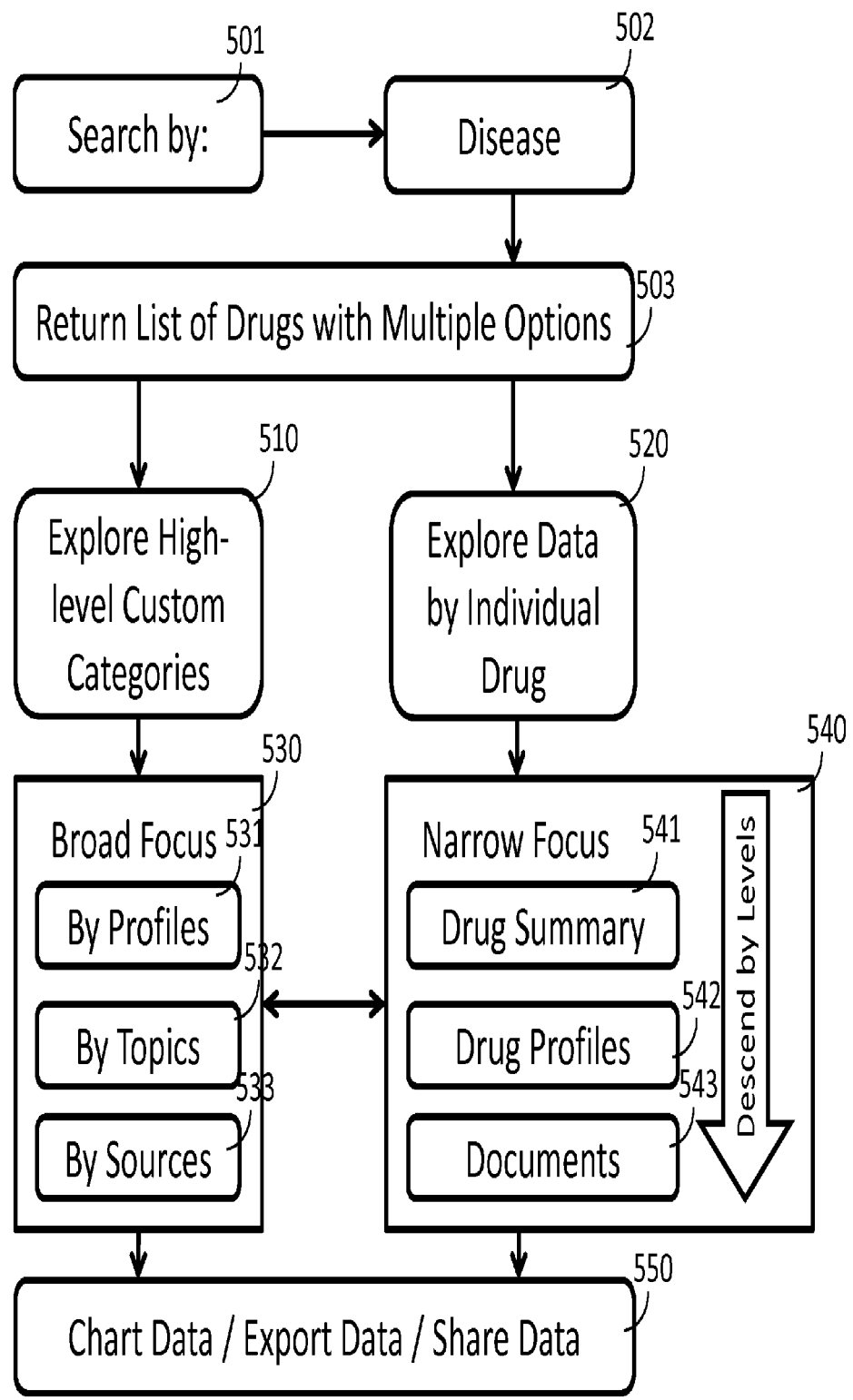
FIG. 5 is a process flow diagram of a search process in accordance with an embodiment of the present subject matter.

FIG. 5 shows an example of a process flow provided by the Innovation Engine to enable the user to search and receive analytical data. In this example, the user can select one of several categories to search by 501, which in this case, is Disease 502. The Innovation Engine then returns at 503 a list of drugs which are associated with the Disease, and provides multiple options. The options include, for example, options to explore high-level custom categories 510, which enable the user to search with a broad focus 530, for example, by profiles 531, topics 532, and/or sources 533. The options may also include, for example, options to explore data by individual drug 520. This may allow the user to search using a narrow focus 540, for example, by drug summary 541, drug profiles 542, and/or documents 543. The Innovation Engine may be configured to allow the user to switch between broad focus 530 and narrow focus 540 at any time, as well as narrow down by each of the options 531-533 and 541-543. Based on the user selected options (e.g. criteria), the Innovation Engine delivers, for example, chart data, export data, and/or share data 550 to the user.

Figure 6:
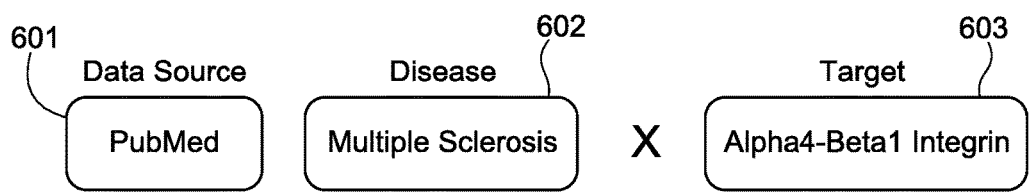
FIG. 6 shows an example of a search and view provided by an embodiment of the present subject matter.
Figure 6:
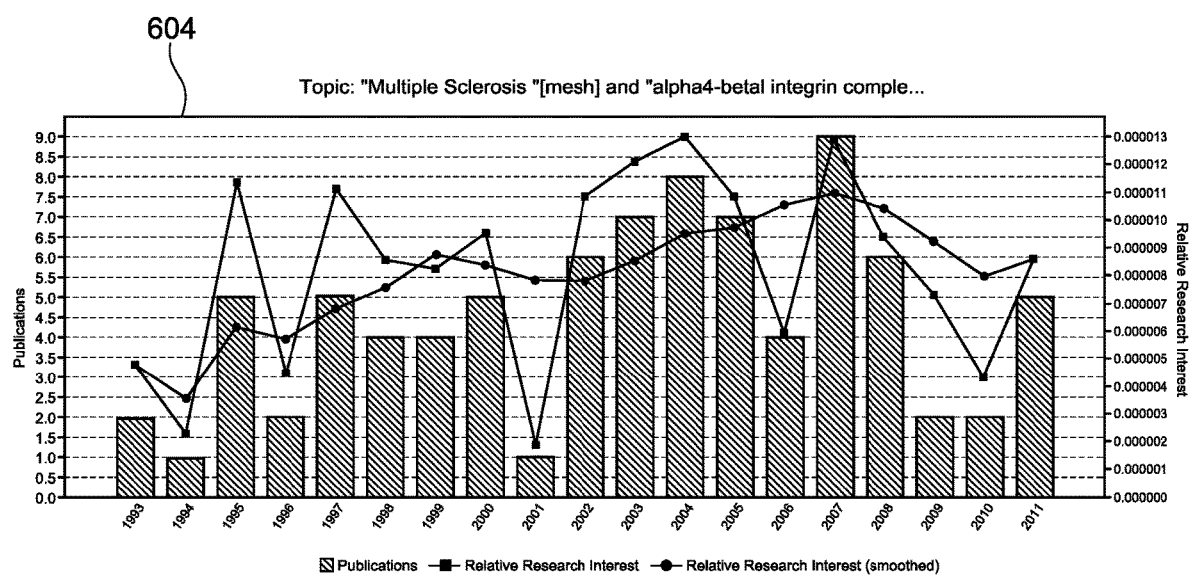

FIG. 6 shows an example of a search and view provided by the Innovation Engine. Here, the user has selected PubMed as the data source 601, Multiple Sclerosis as the Disease 602, and Alpha4-Beta1 Integrin as the Target 603. Based on these search criteria, the Innovation Engine displays a graphical illustration 604 of the associated data.

In some embodiments, the user may access the Innovation Engine at their desktop (e.g. a Personal Computer, terminal, tablet, etc.) on a continuous basis to stay abreast of scientific and market developments in their respective fields of interest. By providing a series of dashboards, which may be customizable, users will be able to monitor clinical trial developments, publication trends, funding awards, and market dynamics on a real-time basis.

The users may interact with the dashboards as well. In some embodiments, the Innovation Engine utilizes one or more visualization tools, such as (e.g.) Google widgets and SPOTFIRE TIBCO to provide a dynamic and hands on experience for business development and licensing professionals to explore complex data sets, and gather insights that would not normally be available. This may be done, for example, by examining the historical trend analysis of a Score for a particular indication. For example, the user interface may be configured to allow the user to visualize the overall trend, and associated events that have impacted the Score for each mechanism of action.

In some embodiments, the user interface may include graphical representations including various levers and dials that will allow the user to influence the weighting of the Score for a given search. In some embodiments, the user may customize how the Score is calculated on a broad scale without revealing the actual calculation(s) that go into the Score. For example, a user may be concerned with the strength of Intellectual Property for a given search, specifically the mention of an indication(s) in the claims, and the term of protection. The user in this case may at the same time not be particularly concerned with the publication record of the molecule, and may choose to decrease this weighting aspect of the Score.

In some embodiments, visualization of the Score over time may be displayed to the user using a temporal line graph that shows annotations of events that impact the Score. By allowing users to view how the score changes over time as well as the events associated with the change, users will gain an appreciation for the components (e.g. the sub-scores) of the Score without knowing the precise weighting and components. Additionally, the interface may be configured to provide a natural history of the historical development trends associated with the search criteria.

EXAMPLE

The following case study, which is based on real events, is provided as an example to illustrate how the event of the purchase of Company S assets by Company R could be predicted by the Score, and what happens when, for example, a paper P is published and how it impacts the scoring system in accordance with some embodiments of the present subject matter.

The paper P references multiple profiles within the Innovation Engine database:
  Compound—Compound R and Company S's compound R-like small molecule activators;
  Gene/Mechanism—GeneX1, GeneX2, GeneX3, Disease: Type 2 Diabetes;
  People (Major)—Dr. X, Dr. Y, and Dr. Z;
  Commercial entities/Institutions—Company S, University T, and Medical School M.

When paper P was published (in 2007), all of these profiles would have been established for several years. Here is how the Score for the compound (Company S's compounds) and mechanism/gene (GeneX1) would have evolved in the Innovation Engine database.

While Compound R itself has a profile in the database that would show up as a GeneX1 activator according to the publication and patent records, the actual Company S compounds that were sold to Company R entered the database as a result of a 2005 patent application. Based on that application, the Innovation Engine would record that Company S owns a set of small molecule drugs targeted at GeneX for use in a cadre of diseases including Type 2 Diabetes. The list of gene targets that would be recorded include GeneX1, GeneX2, GeneX3, and all the associated genes. This is important because when the compound actually gets a name later, which can be taken from press releases or future publications, it will be associated back to the appropriate patent or set of patents. So when the original patent application comes in, the Innovation Engine creates a defector compound profile for all compounds—target matches. In other words, based on what is in that patent application, we know that company S may have compounds that modulate human GeneX1, GeneX2, GeneX3, etc. The database would therefore include all the compounds for company S based on this patent, and the compound and their mechanism/gene targets would be linked through the gene profile to a number of diseases, researchers, institutions, etc., which would subsequently contribute to that compound's Score at the time they enter the database. Later on, in publications and press releases when the name is identified, it will be added as synonym to the current internal name, joining the profiles. Furthermore, company S had originally licensed Dr. X's compound R derivative compounds from Medical School M in 2004, these profiles would have already existed and would have been synonymously linked when the new filings were submitted.

It should be noted that while up-to-date and published list of known compounds and their synonyms have been used to build the basis for the system, the issue of how to enter new compounds is a critical one. Because the Innovation Engine determines a predictive score which may be based on the likelihood of a compound to be licensed, this commercial event is dependent largely on a base of intellectual property. In other words, without a patent there is nothing to license. While compound profiles can exist without a patent, driven largely by the mechanism/gene profile, and publication/clinical history, the important compounds have a patent for our purpose. Accordingly, in some embodiments, the Innovation Engine preferably obtains new compound profiles from patent applications. Furthermore, patent application are likely to link the compound to an inventor/researcher, commercial entity/institution, gene/mechanism, disease or all four profiles, thus instantly allowing the Innovation Engine to generate a Score (or rankable profile) for the compound within the database.

To see how the Score of a compound could evolve over time, let's look back in time a bit more. In 1999, Dr. X (eventual co-founder of company S) authored a paper with another researcher Dr. G, which for the first time, mentions GeneX1 with human disease. At that time, Dr. X was a post-doctoral fellow in Dr. G's laboratory, and while an up and coming researcher, particularly in the cell cycle and yeast field, it would have been Dr. G's involvement that would be of importance. Dr. G was an established researcher with a strong grant history (recorded in the Innovation Engine system from the NIH database) who would have added to the importance of this paper to GeneX1 in drug development. The initial work focused around cell biology, and most cell biology related to Cancer research focused on cell cycle, DNA damage, and senescence. The translational aspects of this research were primary to Cancer. Thus, the initial work would have improved the rank of GeneX1 as a drug target within Oncology.

Between 2000 and 20001, a number of related publications and patents, including a patent by Dr. G became available.

In 2002, Dr. G and other researchers received the first R01's (major research grants from NIH—also captured by the Innovation Engine) for GeneX1 and metabolism (metabolism would link the grant and the mechanism to Diabetes in our database), and the field essentially explodes from there. The number of grants, patents, and publications increased dramatically in both number and prestige between 2001 and 2004 for GeneX1 in metabolism and diabetes. In 2003, Dr. X (now no longer working for Dr. G, and with his own lab at Medical School M) authors a paper, which is published by a prestigious journal, became the first one to demonstrate the positive effects of GeneX1 activation in metabolism, which he did with a group of Compound R-like compounds he had paid to have generated. He subsequently patented those compounds for activation of Gene1. All of this information was attainable from the related patent application and would have entered the Innovation Engine database as independent compounds which are linked directly to Dr. X's investigator profile in the database.

Over the following two years, 2003-2005, the number and prestige of publications increased dramatically. The number of grants for GeneX1 research expanded. The number of patents filed with the USPTO expanded, including Company S's patents. GeneX1 abstracts presence at multiple conferences also expanded over the period.

Company S was founded in 2004 by Dr. Y, and licensed the original Dr. X compounds. All of this information was in press releases from 2004, and would have been linked to the profiles of company S, Dr. X, GeneX1, and Diabetes. At this stage sometime in late 2004 and early 2005, the GeneX1 compounds would have begun to be in the top-ranked quartile within pre-clinical Diabetes compounds according to the Score. This position would have only been enhanced by additional patent filings, grant funding, and the publication of results linking GeneX1 to more established diabetes disease pathways, and other dysfunctions (all of which the Innovation Engine database would already be able to correlate based on the data it pulls from the relational KEGG database). A number of other publications ultimately led up to the 2007 paper P sponsored by company S, but the evidence had continued to build in multiple preclinical models of Diabetes that activation of GeneX1 could be a treatment. For company S, the paper represented the first demonstration of in vivo efficacy for their compounds and certainly contributed to the purchase of the company by company R less than four months later.

Since the 2007 paper P, a controversy developed in the literature surrounding GeneX1 activation by company S compounds and the lead candidate showed lackluster results in early clinical trials for diabetes. Both of these issues would have impacted the compound's Score. However, company S has several compounds in development and the literature has expanded. One of the key findings is that other genes of the GeneX family may actually be more important targets in Diabetes, and other diseases continue to pursue GeneX targets. Specifically, Dr. G's own company has several patents surrounding GeneX modulating compounds, and another company in 2009 acquired an exclusive option to acquire Dr. G's company after the company postponed an IPO during the economic downturn.

Calculating the Score: As discussed above, the Score may include one or more variables including, for example, (1) Stage of Development, (2) Scientific Relevance, (3) Therapeutic Relevance, (4) Intellectual Property, (5) Inventor Profile, and (6) Commercial Entity Profile. Using the case study, here is how the Score would be calculated, in accordance with an embodiment of the Innovation Engine, at two different time periods: right after the paper P in late 2007, and January 2005.

Stage of Development 2005—At this time, there are no GeneX1 compounds in the clinic for any indication. However, there are several preclinical steps published, including use of the compounds in a model, use of the compounds in vitro, use of the compounds rescue of Knock Out (KO) animals, genetic KO Mouse, yeast, and *C. elegans*, publications on the gene in key diabetic disease models and relevant tissue models, and a significant background literature on the core compound R including clinical studies. Furthermore, the transactional stage of the compounds had begun to advance; patents had been filed by more than one party, licenses had occurred, start-up companies formed.

Stage of Development 2007—In additional to all studies noted above, several other in vivo steps had been taken with the compounds, more patents had been filed, more companies started, more licenses executed.

Scientific Relevance 2005—By 2005, the importance of GeneX1 in Diabetes had begun to accelerate as noted by the number and prestige of the publications, similarly the presence of the work in abstracts for conferences, as well as the increasing number of major NIH grants from the relevant funding agencies signified the rising position of the gene/mechanism scientifically. However, at that time the major areas of research focus in terms of Diabetes treatments focused around other targets, and these targets remained better classified in some cases and compounds targeting those genes were considered to have more scientific relevance. Of note in late 2004, several publications emerged functionally linking the function of GeneX1 and other genes. However, this was already established in multiple signaling pathway databases (such as the ones already imported into the database), this link would have added to the value of GeneX1 programs.

Scientific Relevance 2007—The GeneX family had taken off as important players in metabolic disease with grant support and publication rates expanding exponentially from 2004-2007, this would have increased the scores of GeneX1 compounds, as well as the scores of all GeneX targeting compounds. According to the weighting of this embodiment, much of this relevance would have been incorporated by 2005.

Therapeutic Relevance 2005—At this early stage there would be only a few boxes checked for this component of the score. The compound was oral which would be a positive for this indication, and early studies had indicated disease prevention and reversal.

Therapeutic Relevance 2007—Not a lot of changes since 2007, the lack of pharmacology studies at this stage would be a slight negative to the compound.

Intellectual Property 2005—The number of submissions, the breadth of the claims, and the IP holders are all positives for the IP support.

Intellectual Property 2007—Issuance of patents for company S, completion of licensing deals, as well as a number of the details of the 2007 patents which ensure breadth of claim are all incremental positives for the compounds.

Inventor/Researcher Profile 2005—Dr. X, although young and lacking strong funding history from the NIH, would still receive relatively high marks for GeneX1 specifically. His affiliations at a prestigious university benefit his Score (ranking). If he had a compound for oncology, his score in GeneX1 would be higher due to arguably equal levels in oncology and diabetes.

Inventor/Researcher Profile 2007—Dr. X's Score would be improved not only because of the successful license of the technology, but because of NIH grants, publications and title promotion at his university.

Commercial Entity/Institution Profile 2005—Both Medical School M and company S would be considered in this evaluation. Medical School M is a prestigious institution, and therefore positively impacts the translational/commercial attractiveness in the marketplace. Company S would be scored as an emerging company, however considered very well capitalized ($45 MM a round shortly before this date). Additionally, Y's track record, the board members, the advisory board, and their recent success would be considered.

Commercial Entity/Institution Profile 2007—Somewhat similar, however additional raises and IP would be considered.

In summary, in 2005, despite being preclinical the compounds had achieved several hurdles adding value on both the IP, Scientific Relevance, Stage of Development, Inventor, and Entity aspects. Relative to other potential targets in diabetes, it would be considered a relative newcomer, but a fast rising start (and important factor in the Innovation Engine). The primary advancements from there to 2007 involve further advancement in stage of development, enhancement of scientific relevance, expanded IP protection, and improved profile of Dr. X. It could be said that company R would not have purchased the company without the in vivo data, and or the final patent issuance, both of which were likely important factors. However, a number of other factors clearly contributed to the deal, and the fact that Dr. G's company partnered with another company less than a year after validates the broader approach.

As discussed above, the Innovation Engine creates quantitative metrics for analyzing, predicting, and measuring trends, which may be used in fields including: diagnostics markers, life science tools, genetic tools and technologies, proteomic tools and technologies, medical devices, surgical devices and technologies, imaging tools and technologies, drug repositioning, generic pharmaceuticals, antibody production, animal model production, stem cell therapy, regulatory, pharmaceutical and biological manufacturing, clinical trial design, intellectual property strategy, human resources, nutraceuticals research, healthcare policy, investment strategies (VC hedge angel), public securities trading instruments, education, and bioinformatics. Ingestion of additional data sources such as patient medical records, insurer information, Medicare inpatient statistics, or patient genetic information would enable the existing system to be leveraged to analyze, predict, and measure trends in physician performance, diagnosis and therapeutic decision trees, cost benefit analysis of treatment, comparative effectiveness, reimbursement trends, and cause of adverse events. The system can enable software applications for use by physicians, hospitals, administrators, policy makers, insurers, government officials, and patients. The system and ontologies are also specifically designed to enable production of consumer/patient driven application for interaction with individual electronic medical records and background trends and data.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Figure 7:
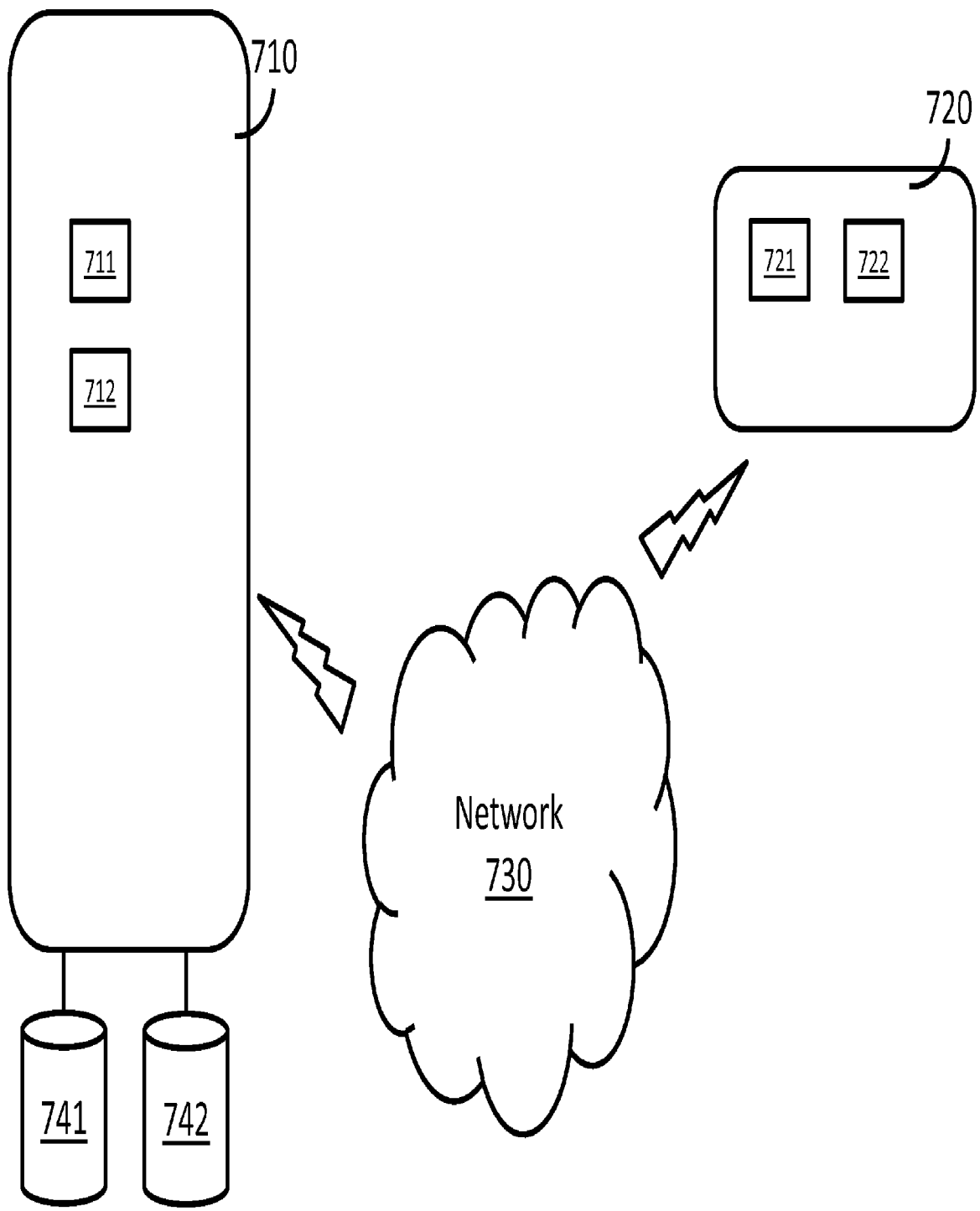
FIG. 7 is a diagram showing an example of a computing system in which the present subject matter can be implemented.

FIG. 7 is a diagram showing an example of a computing system in which the present subject matter can be implemented. As shown, the computing system includes a back-end component 710, such as for example one or more data servers, or that includes a middleware component, such as for example one or more application servers, or that includes a front-end component 720, such as for example one or more client computers having a graphical user interface or a Web browser through which a user can interact with an implementation of the subject matter described herein, or any combination of such back-end, middleware, or front-end components. These components may include one or more processors 711, 721, and memory 712, 722 (e.g. computer readable medium for storing instructions). The computing system may also include one or more data storage 741, 742. The client and server are generally, but not exclusively, remote from each other and typically interact through a communication network 730, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A method, implemented via a server computing device, the server computing device comprising a processor and a memory configured to store a plurality of instructions executable by the processor to implement the method, the method comprising:
   receiving, by an innovation engine, data of a publication descriptive of a drug;
   transforming, by the innovation engine, the data into a structured schema for breaking text included in the data into subsections, wherein the structured schema is a generalized architecture of document contents;
   extracting, by the innovation engine, context associated with the drug from the subsections;
   processing, by the innovation engine, the text to add meta-data to the structured schema to apply the context of the data;
   determining, by a first tier of the innovation engine, context specific occurrences of variables associated with the drug in the data based on the context;
   generating, by a second tier of the innovation engine, trend data from the data, wherein the trend data is based on one or more of publication rates associated with the drug, grant rates associated with the drug, or development stage associated with the drug;
   applying, by a third tier of the innovation engine, machine learning to determine a weighting of at least one variable from the first tier or trend data from the second tier by comparing, on a temporal basis, the variables from the first tier and the trend data from the second tier to transactional information associated with other drugs, wherein the transactional information comprises one or more of funding history, licensing data, or merger and acquisitions data;
   transmitting, by the innovation engine, the weighting to a user interface of a client computing device;
   receiving, by a controller, from the user interface of the client computing device a query based, at least in part, on the transmitted weighting;
   executing, by the controller, the query against the structured schema to produce a result;
   transmitting, by the controller, the result to the client computing device and displaying the result on the user interface of the client computing device;
   receiving, by the controller, from the user interface of the client computing device, instructions through user interface elements to modify the weighting; and
   generating and displaying, by the controller, an updated result on the user interface of the client computing device based on the modified weighting.

2. The method of claim 1, wherein the weighting is determined based on an influence of the at least one variable from the first tier or trend data from the second tier in achieving prior market performance of the other drugs.

3. The method of claim 2, further comprising:
   generating, by the innovation engine, a sub-score for each of the variables; and
   summing, by the innovation engine, the sub-scores to generate a composite score.

4. The method of claim 3, further comprising generating, by the innovation engine, one or more quantitative metrics having a temporal component based, at least in part, on the received data.

5. The method of claim 4, further comprising generating, by the innovation engine, metadata based at least in part, on the extracted context of the data.

6. The method of claim 5, further comprising measuring, by the innovation engine, a confidence in at least one of the variables by calculating a number of times the at least one of the variables has been associated with previous data.

7. The method of claim 6, further comprising elevating, by the innovation engine, a weighting of the at least one of the variables when the at least one of the variables has been associated with previous data.

8. The method of claim 7, further comprising analyzing, by the innovation engine, the data with respect to a plurality of predefined key words.

9. A server computing device comprising:
at least one programmable processor and a non-transitory machine-readable medium storing instructions that, when executed by the at least one programmable processor, perform the method comprising:
receiving, by an innovation engine, data of a publication descriptive of a drug;
transforming, by the innovation engine, the data into a structured schema for breaking a text included in the data into subsections, wherein the structured schema is a generalized architecture of document contents;
extracting, by the innovation engine, context associated with the drug from the subsections;
processing, by the innovation engine, the text to add meta-data to the structured schema to apply the context of the data;
determining, by a first tier of the innovation engine, context specific occurrences of variables associated with the drug in the data based on the context;
generating, by a second tier of the innovation engine, trend data from the data, wherein the trend data is based on one or more of publication rates associated with the drug, grant rates associated with the drug, or development stage associated with the drug;
applying, by a third tier of the innovation engine, machine learning to determine a weighting of at least one variable from the first tier or trend data from the second tier by comparing, on a temporal basis, the variables from the first tier and the trend data from the second tier to transactional information associated with other drugs, wherein the transactional information comprises funding history, licensing data, or merger and acquisitions data;
transmitting, by the innovation engine, the weighting to a user interface of a client computing device;
receiving, by a controller, from the user interface of the client computing device a query based, at least in part, on the transmitted weighting;
executing, by the controller, the query against the structured schema to produce a result;
transmitting, by the controller, the result to the client computing device and displaying the result on the user interface of the client computing device;
receiving, by the controller, from the user interface of the client computing device, instructions through user interface elements to modify the weighting; and
generating and displaying, by the controller, an updated result on the user interface of the client computing device based on the modified weighting.

10. The server computing device of claim 9, wherein the weighting is determined based on an influence of the at least one variable from the first tier or trend data from the second tier in achieving prior market performance of the other drugs.

11. The server computing device of claim 10, further comprising:
generating, by the innovation engine, a sub-score for each of the variables; and
summing, by the innovation engine, the sub-scores to generate a composite score.

12. The server computing device of claim 11, further comprising generating, by the innovation engine, one or more quantitative metrics having a temporal component based, at least in part, on the received data.

13. The server computing device of claim 12, further comprising generating, by the innovation engine, metadata based at least in part on the extracted context of the data.

14. The server computing device of claim 13, further comprising measuring, by the innovation engine, a confidence in at least one of the variables by calculating a number of times the at least one of the variables has been associated with previous data.

15. The server computing device of claim 14, further comprising elevating, by the innovation engine, a weighting of the at least one of the variables when the at least one of the variables has been associated with previous data.

16. The server computing device of claim 15, further comprising analyzing, by the innovation engine, the data with respect to a plurality of predefined key words.

17. The method of claim 1, wherein the user interface includes graphical representations to allow the user to change the weighting for the query.

18. The method of claim 8, further comprising displaying, on the user interface, visualization of the sub-scores or composite score over time using a temporal line graph showing annotations of events that impact the sub-scores or composite score.

19. The server computing device of claim 16, wherein the user interface includes graphical representations to allow the user to change the weighting for the query.

20. The server computing device of claim 16, wherein the method performed by the at least one programmable processor further comprises:
displaying, on the user interface, visualization of the sub-scores or composite score over time using a temporal line graph showing annotations of events that impact the sub-scores or composite score.

* * * * *